(12) United States Patent
Bubeck et al.

(10) Patent No.: US 6,557,341 B2
(45) Date of Patent: May 6, 2003

(54) EXHAUST SYSTEM OF AN INTERNAL COMBUSTION ENGINE

(75) Inventors: Guenther Bubeck, Schorndorf (DE); Normann Freisinger, Lorch (DE); Roland Kemmler, Stuttgart (DE); Martin Matt, Bruchsal-Untergrombach (DE); Jens Quinten, Nalbach (DE); Peter Struebel, Fellbach (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/060,095

(22) Filed: Jan. 29, 2002

(65) Prior Publication Data

US 2002/0100273 A1 Aug. 1, 2002

(30) Foreign Application Priority Data

Jan. 31, 2001 (DE) .......................... 101 04 021

(51) Int. Cl.$^7$ ................................ F01N 3/00
(52) U.S. Cl. .............. 60/284; 60/287; 60/292
(58) Field of Search ................. 60/284, 288, 292, 60/287

(56) References Cited

U.S. PATENT DOCUMENTS

| | | | | | |
|---|---|---|---|---|---|
| 3,943,710 A | * | 3/1976 | Lange | .................. | 60/288 |
| 4,685,291 A | * | 8/1987 | Ha | .................. | 60/286 |
| 4,926,634 A | * | 5/1990 | Putz et al. | .................. | 60/323 |
| 5,144,799 A | * | 9/1992 | Barth | .................. | 60/313 |
| 5,384,098 A | * | 1/1995 | Morikawa | .................. | 422/111 |
| 5,582,004 A | * | 12/1996 | Rutschmann | .................. | 60/288 |
| 5,937,640 A | * | 8/1999 | Krzykowski et al. | .................. | 60/284 |
| 5,956,949 A | * | 9/1999 | Mayer et al. | .................. | 60/301 |
| 6,223,527 B1 | * | 5/2001 | Philips | .................. | 60/288 |

FOREIGN PATENT DOCUMENTS

| | | |
|---|---|---|
| DE | 197 40 702 | 11/1998 |
| JP | 06-159045 | * 6/1994 |

* cited by examiner

*Primary Examiner*—Diem Tran
(74) *Attorney, Agent, or Firm*—Klaus J. Bach

(57) ABSTRACT

In an exhaust system for an internal combustion engine having two groups of cylinders with a separate exhaust line for each cylinder group, each including an upstream catalytic converter and a downstream catalytic converter and a control valve, a first transverse connection extending between the exhaust lines upstream of the upstream catalytic converters and a second transverse connection extending between the exhaust lines between the upstream and downstream catalytic converters, the valves are so arranged and controlled that, during warm-up, the exhaust gases from both cylinder groups flow through the upstream catalytic converter of one, and the downstream catalytic converter of the other exhaust line for rapid heat up of one of the catalytic converters in each of the exhaust lines.

7 Claims, 2 Drawing Sheets

EXHAUST SYSTEM OF AN INTERNAL COMBUSTION ENGINE

BACKGROUND OF THE INVENTION

The invention relates to an exhaust system of an internal combustion engine with two exhaust lines, of which each includes two catalytic converters and a valve for controlling the exhaust gas flow through the exhaust lines.

DE 197 40 702 C1 discloses an exhaust system for an internal combustion engine with two catalytic converters arranged in an exhaust duct so that they can be placed in series by a valving structure.

Furthermore, exhaust systems are known which include two separate exhaust ducts. Each exhaust duct includes two catalytic converters; one disposed closely adjacent the engine, a so-called fire wall catalytic and one disposed below the vehicle floor, a so-called underfloor catalytic converter. In order to achieve a high exhaust gas conversion rate, particularly in the two catalytic converters near the engine, it is important that the fire wall catalytic converters reach their operating temperature or, respectively, conversion temperature as rapidly as possible. During the starting phase, particularly the start-up phase of the internal combustion engine, the temperatures of the fire wall catalytic converters so far could not be increased rapidly enough so that the exhaust gases of the internal combustion engine could not be cleaned up sufficiently during the starting phase.

It is the object of the present invention to provide an exhaust system for an internal combustion engine in which the catalytic converters reach their operating temperature rapidly after start-up of the engine so that exhaust emissions during the start-up phase of the engine, particularly during a cold start, are substantially reduced.

SUMMARY OF THE INVENTION

In an exhaust system for an internal combustion engine having two groups of cylinders with a separate exhaust line for each cylinder group, each including an upstream catalytic converter and a downstream catalytic converter and a control valve, a first transverse connection extending between the exhaust lines upstream of the upstream catalytic converters and a second transverse connection extending between the exhaust lines between the upstream and downstream catalytic converters, the valves are so arranged and controlled that, during engine warm-up, the exhaust gases from both cylinder groups flow through the upstream catalytic converter of one and the downstream catalytic converter of the other exhaust line for rapid heat up of one of the catalytic converters in each of the exhaust lines.

With the arrangement according to the invention, the respective catalytic converters can be heated very rapidly so that they are rapidly activated and the engine emissions are reduced to a low level soon after engine start-up.

The invention will be described below in greater detail on the basis of the accompanying drawings.

DESCRIPTION OF A PREFERRED EMBODIMENT

Figure 1:
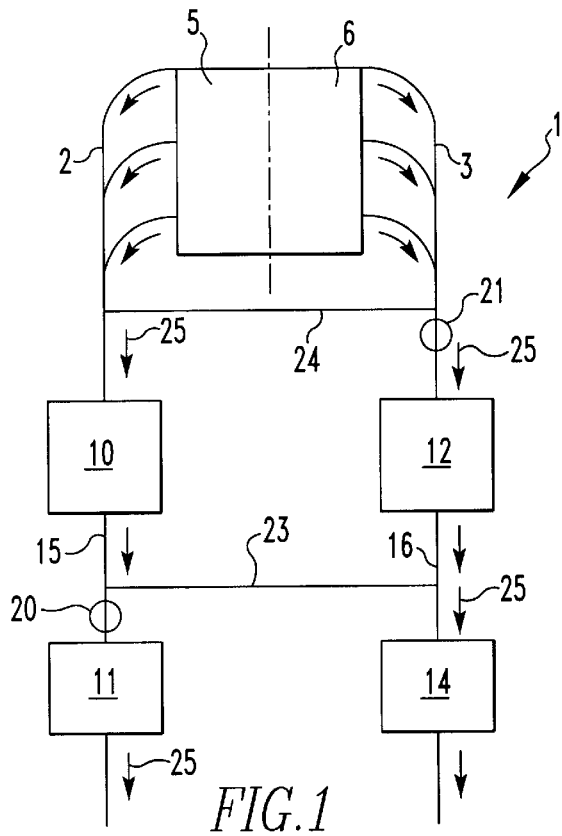
FIG. 1 shows schematically one particular embodiment of the invention, as employed in connection with a V-type engine.

FIG. 1 shows schematically an exhaust system for a V-type engine, which has two engine exhaust lines 2 and 3. Below, the exhaust gas routing for a normal operation of a six cylinder V-type engine will be described, wherein the catalytic converters 10, 11, 12, 14 are at normal operating temperature since the engine has already been operating for some time so that the noxious emissions generated in the engine cylinders are converted in the catalytic converters 10, 11, 12, 14. The V-type 6-cylinder engine includes two cylinder banks 5, 6 with three cylinders contained in each. Under normal operation, the exhaust gas from each of the two cylinder banks flows through the respective exhaust line so that about the same amount of exhaust gas flows through each of the two exhaust lines.

The first exhaust line 2 shown in FIG. 1 at the left extends for example from the three cylinder outlets of one cylinder bank, that is, the left cylinder bank 5 to a first firewall (upstream) catalytic converter 10. From the first firewall catalytic converter 10, the exhaust gas reaches by way of a first connecting line 15 and a first flow control valve 20 arranged in the first connecting line 15, a first left line under floor (downstream) catalytic converter 11. The control valve 20 is open. From the first, that is, the left line underfloor converter 11, the exhaust gas is discharged to the environment by way of an end pipe, which is not shown.

In the same way, the exhaust gas of the three cylinders of the right cylinder bank 6 flows through the exhaust line 3 to the right side fire wall (upstream) catalytic converter 12. Upstream of the right firewall catalytic converter 12, the exhaust line 3 includes a second valve 21, which is in an open position. From the right firewall catalytic converter 12, the exhaust gas is conducted through a second connecting line 16 to a second, right line under floor (downstream) catalytic converter 14. From the right line underfloor catalytic converter, the exhaust gas is discharged to the environment by way of an end pipe, which is not shown.

As shown by the arrows 25, which indicate the exhaust gas flow, no exhaust gas flows through the transverse flow connections 24 and 23 extending between the exhaust lines 2 and 3 and, respectively, the connecting lines 15 and 16.

Figure 2:
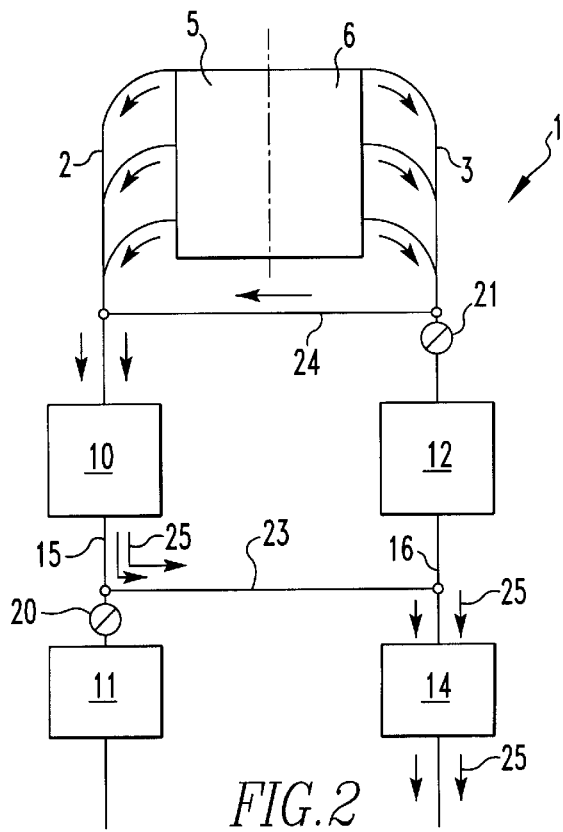
FIG. 2 shows the arrangement of FIG. 1, wherein, however, the valves are differently set so as to provide for a different flow pattern.

Below, the operation of the exhaust system during the engine start-up operating phase, particularly the cold start phase and the subsequent warm-up phase, will be described. Such an operation is shown in FIG. 2, wherein the flow path of the exhaust gas is indicated by the arrows 25. This operation is characterized as single line operation since the exhaust gas flows only through one firewall catalytic converter and one underfloor catalytic converter.

In this operational phase, the two valves 20 and 21 are closed. The exhaust gas from the first cylinder bank 5 flows to the left firewall catalytic converter 10. Because the valve 21 is closed, the exhaust gas from the second cylinder bank 6 is conducted through the connecting line 24 also to the left fire wall catalytic converter 10. Because also the valve 20 is closed, the exhaust is diverted downstream of the left firewall catalytic converter 10, through the transverse connection 23 to the second connecting line 16 and to the right under floor catalytic converter 14. From the right underfloor catalytic converter 14, the exhaust gas is discharged to the environment by way of an end pipe, which is not shown in detail.

This single line operating procedure makes it possible to conduct the exhaust gas from both cylinder banks through the same firewall catalytic converter, in the example, through the firewall catalytic converter 10 disposed in the exhaust gas line 2 and all the exhaust gas is then conducted through the under floor catalytic converter 14 of the other exhaust line 3 so that only one catalytic converter in each exhaust gas line 2, 3 is heated. Since only a single fire wall catalytic converter 10 has to be heated to the conversion temperature using the exhaust gas from both cylinder groups, the exhaust system becomes rapidly operative particularly during a cold start of the engine. After at least one of the catalytic converters in each exhaust line has become operative, the valves 20 and 21 can be opened for a two-line operation. The valves can be controlled by an electronic control device, which is not shown.

The fire wall catalytic converters 10 and 12 are of course not necessarily disposed at the vehicles firewall. Also the underfloor catalytic converters do not need to be disposed below the vehicle floor. Other suitable locations may be selected for the arrangement of the catalytic converters.

The valves 20, 21 may be butterfly valves as they are commonly used for the flow control of gases.

The catalytic converters 10, 11, 12, 14 used in the exemplary embodiment are three-way catalytic converters. But other suitable catalytic converters such as SCR (Selenium Catalytic Reduction) catalytic converters, oxidation catalytic converters, adsorption catalytic converters or appropriate combinations thereof may be used.

Figure 3:
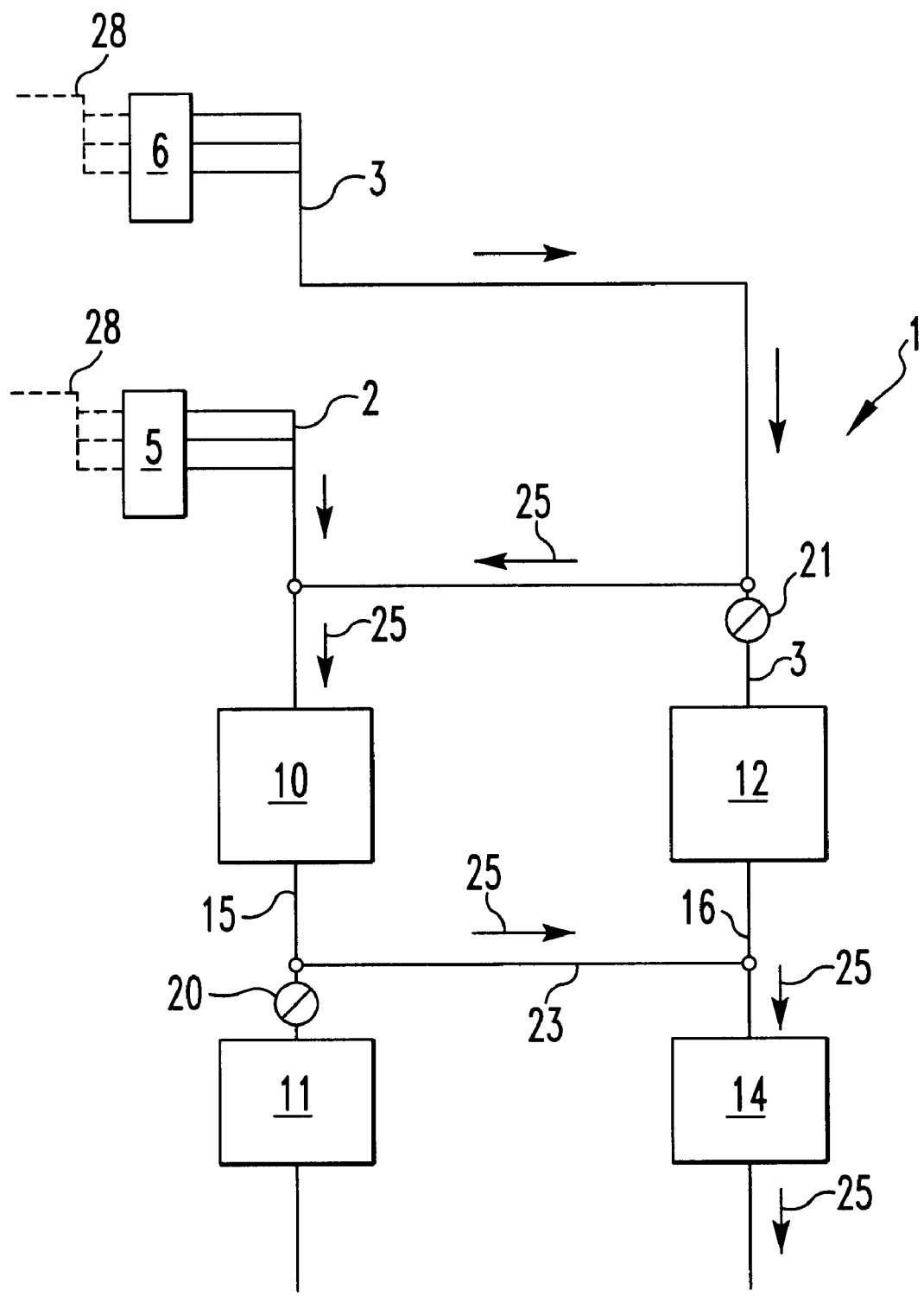
FIG. 3 shows the invention as applied to an inline six cylinder engine.

FIG. 3 shows another embodiment of the invention, wherein the same components, or in principle identical components, are designated by the same reference numeral used in FIGS. 1 and 2. In this case, an in-line six cylinder engine is shown whose first cylinder bank 5 is connected to the first exhaust line 2 and whose second cylinder bank 6 is connected to the second exhaust line 3. FIG. 3 shows in dashed lines the intake ducts for the cylinder banks 5, 6. Furthermore, the single line operation with closed valves 20, 21 is represented as indicated by the arrows 25. With the valves 20, 21 closed, the system is operated in a single line operation. The arrangement, of course, is applicable also to 8, 10, 12, etc . . . cylinder V-type or inline engines.

What is claimed is:

1. An exhaust system for an internal combustion engine having two groups of cylinders, a separate exhaust line for each group of cylinders, each exhaust line including an upstream catalytic converter, a downstream catalytic converter, and a control valve, a first transverse connection extending between said exhaust lines upstream of said upstream catalytic converters and a second transverse connection extending between said exhaust lines between said upstream and said downstream catalytic converters, said control valves being so arranged and controllable that, during an initial warm-up period, the exhaust gas from both groups of cylinders is conducted through an upstream catalytic converter in only one of the exhaust lines and through a downstream catalytic converter in the other exhaust line for rapidly heating one of the catalytic converters in each of said exhaust lines and, after the upstream catalytic converter of the one and the downstream catalytic converter of the other exhaust line have reached critical operating temperature, the exhaust gas from each group of cylinders is conducted separately through its associated exhaust line and its upstream and downstream catalytic converters.

2. An exhaust system according to claim 1, wherein said two valves are so controllable that they are closed below a certain critical catalytic converter operating temperature and open at an operating temperature higher than said certain critical operating temperature.

3. An exhaust system according to claim 2, wherein said critical operating temperature is the conversion temperature of said catalytic converters.

4. An exhaust system according to claim 3, wherein said valves are so arranged in the two exhaust lines that, upon closing of said valves, the exhaust gas flows through the respective transverse connections from the one exhaust line to the other.

5. An exhaust system according to claim 1, wherein said valves are butterfly valves.

6. An exhaust system according to claim 1, wherein said upstream catalytic converters are firewall catalytic converters, which are mounted in close proximity to said engine.

7. An exhaust system according to claim 1, wherein said downstream catalytic converters are underfloor catalytic converters, which are disposed below a vehicle floor.

* * * * *